United States Patent [19]

Ejiri et al.

[11] Patent Number: 4,729,922

[45] Date of Patent: Mar. 8, 1988

[54] MAGNETIC RECORDING MEDIUM

[75] Inventors: Kiyomi Ejiri; Hideaki Kosha; Akihiro Matsufuji, all of Kanagawa, Japan

[73] Assignee: Fuji Photo Film Co., Ltd., Kanagawa, Japan

[21] Appl. No.: 929,316

[22] Filed: Nov. 12, 1986

[30] Foreign Application Priority Data

Nov. 11, 1985 [JP] Japan .................. 60-250839
Nov. 11, 1985 [JP] Japan .................. 60-250840

[51] Int. Cl.$^4$ ............................................. G11B 5/70
[52] U.S. Cl. ................................ 428/328; 428/323; 428/694; 428/900
[58] Field of Search ............... 428/323, 328, 694, 900; 427/128

[56] References Cited

U.S. PATENT DOCUMENTS

| | | | |
|---|---|---|---|
| 4,328,935 | 5/1982 | Steel | 428/900 |
| 4,420,531 | 12/1983 | Tokuda | 428/694 |
| 4,425,400 | 1/1984 | Yamaguchi et al. | 428/694 |
| 4,529,661 | 7/1985 | Ninomiya et al. | 428/694 |
| 4,613,545 | 9/1986 | Chubachi et al. | 428/694 |
| 4,618,536 | 10/1986 | Morioka et al. | 428/694 |

*Primary Examiner*—Paul J. Thibodeau
*Attorney, Agent, or Firm*—Sughrue, Mion, Zinn, Macpeak, and Seas

[57] ABSTRACT

A magnetic recording medium comprises a non-magnetic support having provided thereon a magnetic layer containing magnetic particles dispersed in a binder. The magnetic layer contains acicular $Cr_2O_3$ having an average length in the long axis of 1.0 $\mu$m or less, an average length in the short axis of 0.1 $\mu$m or less and an acicular ratio (long axis/short axis) of from 5/1 to 20/1 in an amount of from 1 to 20 wt % based on the total weight of the magnetic particles. The binder comprises at least one material selected from the group consisting of polyurethane having a glass transition temperature (Tg) of from 0° to 95° C. or containing a metal sulfonate group, or a vinyl chloride resin containing a metal sulfonate group.

6 Claims, No Drawings

MAGNETIC RECORDING MEDIUM

FIELD OF THE INVENTION

The present invention relates to a magnetic recording medium comprising a non-magnetic support having provided thereon a magnetic layer, and more particularly, it relates to a magnetic recording medium having improved running durability.

BACKGROUND OF THE INVENTION

In the past, a magnetic recording medium which is prepared by dispersing ferromagnetic particles such as $\gamma\text{-}Fe_2O_3$, Co-containing iron oxide, chromium dioxide or ferromagnetic alloy particles in a binder, and coating the thus obtained dispersion on a non-magnetic support to provide a magnetic layer has been used as a magnetic recording medium for audio recording, video recording and for computers in the shape of a tape or a disk. Recently, in order to realize high density recording and high S/N (signal/noise) ratio of such magnetic recording medium, the magnetic particles have been finely divided. However, with the tendency to make the magnetic particles finer and finer, the abrasive property of the magnetic particles is reduced, thereby resulting in a deterioration of the running durability of the magnetic recording medium using the above magnetic particles. This tendency is more striking when ferromagnetic alloy particles having a low hardness are employed.

In order to prevent the deterioration of running durability, it is proposed in U.S. Pat. No. 3,833,412 to add abrasive agents such as granular $Al_2O_3$, SiC or $Cr_2O_3$, to the magnetic layer. However, when a large amount of these abrasive agent is added, the magnetic orientation of the magnetic recording medium, the packing density of the magnetic particles and the dispersibility thereof are deteriorated, whereby the electromagnetic properties are deteriorated due to the deterioration of the surface property (i.e., surface smoothness).

When the added amount of the abrasive agents is reduced to improve the surface property, the electromagnetic properties are improved, but the running property of a magnetic recording medium is deteriorated because the friction coefficient of the magnetic layer increases, thereby leading to sticking between the magnetic head and the magnetic layer during running.

In order to resolve the above described problem, the inventors of the present invention proposed in Japanese Patent Appliction No. 62938/85 (corresponding to U.S. patent application Ser. No. 843,973 filed on Mar. 25, 1986) that acicular inorganic substance having an average length in the long axis of 1.0 $\mu$m or less, an average length in the short axis of 0.1 $\mu$m or less, a acicular ratio (long axis/short axis) of 5 to 20 and a Mohs' hardness of 5 or more be used as an abrasive agent. However, a satisfactory magnetic recording medium still has not been obtained.

SUMMARY OF THE INVENTION

An object of the present invention is to provide a magnetic recording medium having improved running durability and electromagnetic properties at the same time.

As a result of extensive studies to obtain a magnetic recording medium meeting the above described object and having a more improved running property, the present inventors have found that the running durability and the electromagnetic property of a magnetic layer can be remarkably improved by using acicular $Cr_2O_3$ having the above described characteristics which is selected from the above described abrasive agents and by dispersing it with magnetic particles in a specific binder to prepare a magnetic coating composition for a magnetic layer.

That is, the present invention relates to a magnetic recording medium comprising a non-magnetic support having provided thereon a magnetic layer containing magnetic particles dispersed in a binder, wherein the magnetic layer contains acicular $Cr_2O_3$ having an average length in the long axis of 1.0 $\mu$m or less, an average length in the short axis of 0.1 $\mu$m or less and an acicular ratio (long axis/short axis) of 5 to 20 in an amount of from 1 to 20 wt % based on the total weight of the magnetic particles, and wherein the binder contains at least one material selected from the group consisting of a polyurethane having a glass transition temperature (Tg) of from 0° to 95° C. or containing a metal sulfonate group, or a vinyl chloride resin containing a metal sulfonate group.

DETAILED DESCRIPTION OF THE INVENTION

The present invention is hereinafter illustrated in more detail.

The present invention can be applied to a magnetic recording medium which employs conventional iron oxide type and Co-containing iron oxide type ferromagnetic particles and chromium dioxide ($CrO_2$) type ferromagnetic particles, and is particularly effective in a magnetic recording medium which employs ferromagnetic alloy particles, particularly ferromagnetic alloy particles having a specific surface area of 25 $m^2/g$ or more. That is, the ferromagnetic alloy particles have lower hardness as compared with the other ferromagnetic particles, and a magnetic recording medium obtained by using such ferromagnetic alloy particles has a poor abrasive property and also has a poor running durability. However, the above problems can be significantly reduced by applying the present invention.

Non-magnetic supports which can be used in the present invention are not particularly limited, and conventionally known supports can be used. Examples of suitable materials for the non-magnetic support include various synthetic resin films such as polyethylene terephthalate (PET), polypropylene, polycarbonate, polyethylene naphthalate, polyamide, polyamide imide or polyimide, and metal foils such as aluminum foil or stainless steel foil. Although the thickness of the non-magnetic support is not particularly limited, the thickness is generally 3 to 50 $\mu$m, and preferably 5 to 30 $\mu$m.

A backing layer, as described in U.S. Pat. No. 4,414,270 can be provided on the surface of the non-magnetic support which is opposite the surface on which the magnetic layer is provided.

The magnetic recording medium of the present invention is a magnetic recording medium that comprises a nonmagnetic support having provided thereon a magnetic layer having dispersed ferromagnetic particles in a binder.

The ferromagnetic particles which can be used in the magnetic layer of the present invention include ferromagnetic alloy particles (such as Fe-Co, Fe-Ni, Co-Ni-Fe, Co-Ni), $\gamma\text{-}Fe_2O_3$, $Fe_3O_4$, Co-modified ferromagnetic iron oxide, $CrO_2$, modified barium ferrite and modified strontium ferrite, etc. In the present invention, ferromagnetic alloy particles containing iron, cobalt or nickel and having a specific surface area of 25 m²/g or more are particularly preferred.

The metal content of the ferromagnetic alloy particles which can be used in the present invention is preferably 75 wt % or more based on the total weight of the ferromagnetic alloy particles. 80 wt % or more of the metal content of the ferromagnetic alloy particles is composed of at least one ferromagnetic metal (e.g., Fe, Co, and Ni) or ferromagnetic alloy (e.g., Fe-Co, Fe-Ni, Co-Ni, and Co-Ni-Fe). 20 wt % or less of the metal content of the ferromagnetic alloy particles can be other components, e.g., Al, Si, S, Sc, Ti, V, Cr, Mn, Cu, Zn, Y, Mo, Rh, Pd, Ag, Sn, Sb, Te, Ba, Ta, W, Re, Au, Sm, Hg, Pb, Bi, La, Ce, Pr, Nd, B and P. The above ferromagnetic alloy particles can contain a small amount of water, hydroxides or oxides. The ferromagnetic particles which can be used in the present invention, can be prepared in accordance with conventional methods. For example, ferromagnetic alloy particles, which are typical example of ferromagnetic particles which can be used in the present invention, can be prepared in accordance with conventional methods.

The shape of the ferromagnetic alloy particles is not limited, but an acicular shape, a granular shape, a dice shape, a rice grain shape (ellipsoidal) or a tabular shape can be generally employed. Among these, an acicular shape can preferably be employed.

The specific surface area (S BET) of the ferromagnetic alloy particles is preferably 42 m²/g or more, more preferably 45 m²/g or more.

The binder in the magnetic layer of the present invention contains at least one binder material selected from the group consisting of a polyurethane having a glass transition temperature (Tg) of from 0° to 95° C. or containing a metal sulfonate group, or a vinyl chloride type resin containing a metal sulfonate group.

A polyurethane which can be used in the present invention is a copolymer of isocyanates or a copolymer of an isocyanate and a compound having a functional group capable of reacting and bonding isocyanates to form a copolymer so that its glass stransition temperature (Tg) is from 0° to 95° C., preferably from 0° to 75° C., and more preferably from 0° to 60° C. and can optionally be selected. The average molecular weight of the polyurethane is preferably from 5,000 to 100,000, and more preferably from 15,000 to 60,000.

A preferable polyurethane can be a polyester polyurethane or a polyether polyurethane. A polyester polyurethane can be prepared by reacting (a) reactive polyesters (having preferably an average molecular weight of 600 to 3,000) which are obtained by the reaction of organic dibasic acids such as phthalic acid or adipic acid, with glycols such as ethylene glycol, propylene glycol or butylene glycol, polyhydric alcohols such as trimethylol propane, hexantriol, pentaerythritol or cyclohexane-1, 4-diol, or phenols such as bisphenol A, with (b) isocyanates such as tolylene diisocyanate, 4,4'-diphenylmethane diisocyanate or hexamethylene diisocyanate. A polyether polyurethane can be prepared by reacting (c) reactive polyethers (having preferably a molecular weight of 600 to 3,000) which are obtained by the reaction of propylene oxide or ethylene oxide, with (b) isocyanates such as tolylene diisocyanate, 4,4'-diphenylmethane diisocyanate or hexamethylene diisocyanate.

The amount of polyurethane which can be used in the present invention is generally from 10 to 90 wt %, preferably from 15 to 85wt %, and more preferably from 20 to 80 wt %, based on the total weight of binder.

Vinyl chloride resins containing a metal sulfonate group which can be used in the present invention include copolymers of vinyl chloride and other monomers capable of polymerizing with vinyl chloride, such as vinyl acetate, vinylidene chloride, acrylonitrile, styrene or acrylic acid ester, which copolymers are bonded with —SO₃M groups, wherein M represents Li, Na and K. The —SO₃M group is preferably used in an amount of generally 5 mol % or less, preferably from 0.01 to 5 mol %, and more preferably from 0.5 to 3.0 mol %, based on the number of mols of monomers used to form the copolymer. The average molecular weight of the copolymer is preferably from 5,000 to 100,000, and more preferably from 15,000 to 60,000. Further, the vinyl chloride content in the resin is preferably from 80 to 90 wt %, and more preferably from 82 to 88 wt % and the other copolymerizable monomer content in the resin is preferably from 20 to 10 wt %, and more preferably from 18 to 12 wt %. The methods for incorporating the metal sulfonate group into the vinyl chloride resins are described in Japanese Patent Application (OPI) Nos. 44227/82 and 108032/83.

The polyurethane containing a metal sulfonate group which can be used in the present invention is a copolymer bonded with a —SO₃M group (M represents Li, Na, and K, and preferably Na), which can be prepared by reacting isocyanates with each other or reacting isocyanates with a compound having a functional group capable of reacting and bonding the isocyanate to form a polymer. The —SO₃M group is contained in an amount of generally from 0.2 to 20 equivalent, preferably from 0.2 to 10 equivalent, and more preferably from 0.3 to 8 equivalent, based on one molecule of polyurethane. The average molecular weight of polyurethane is preferably from 5,000 to 100,000, and preferably from 15,000 to 60,000, provided that the glass transition temperature (Tg) of the polyurethane for the polyurethane containing a metal sulfonate group is not limited.

A preferable polyurethane for the polyurethane containing a metal sulfonate group can be a polyester polyurethane or a polyether polyurethane which is described above. The methods for incorporating a metal sulfonate group into the polyurethane are described in Japanese Patent Appliction (OPI) Nos. 92422/82 and 92423/82.

The polyurethane containing —SO₃M groups or the vinyl chloride resins containing —SO₃M groups which are used in the present invention can be used alone or in combination with each other, and can be used in an amount of from 10 to 90 wt %, preferably from 15 to 85 wt %, and more preferably from 20 to 80 wt %, on the total weight of binder.

Further, by incorporating a low molecular weight polyisocyanate having an molecular weight of from 150 to 2,000 and having at least two isocyanate groups as other binder, a three dimensional network structure can be formed in a magnetic layer, whereby the physical strength of the magnetic layer can be further improved. The low molecular weight polyisocyanate compound is used in an amount of preferably from 5 wt % to 70 wt % based on the total amount of binder. The low molecular weight polyisocyanate compound includes an isocyanate monomer and oligomer thereof containing at least two isocyanate groups, and an addition product of the monomer or the oligomer and the above described polyhydric alcohols. The isocyanate monomer, for example, includes ethane diisocyanate, 2,2,4-trimethyl penthane diisocyanate, ω,ω'-diisocyanate-1,3-dimethyl benzol, ω,ω'-diisocyanate-1,2-dimethyl cyclohexane diisocyanate, naphthalene-1,4-diisocyanate, and triphenyl methane-4,4',4''-triisocyanate.

In the present invention, binders other than those described above can be used in combination with the above described binders. These other binders include conventionally used thermoplastic resins, thermosetting resins and reactive type resins. One or more than one of these binders can be used in the magnetic layer in combination with the special binders of the present invention. For example, polyurethane or vinyl chloride resins which do not contain —$SO_3M$ groups can be used as a binder.

The thermoplastic resins which can be used are those having generally an average molecular weight of from 10,000 to 200,000 and having a degree of polymerization of generally from about 200 to 2,000, and preferably from 200 to 1,000. Examples of these thermoplastic resins include a copolymer of vinyl chloride and vinyl acetate, a copolymer of vinyl chloride and vinylidene chloride, an acrylic resin, a cellulose derivative, various synthetic rubber type thermoplastic resins, polyvinyl fluoride, a polyamide resin, polyvinyl butyrate, a copolymer of styrene and butadiene, and a polystyrene resin. They can be used alone or in combination.

The thermosetting resins or the reactive type resins include those resins that have an average molecular weight of generally 200,000 or less in a state of a coating solution and then the molecular weight becomes infinite by the condensation reaction or an addition reaction conducted after coating. When these resins are thermosetting resins hardened by heating, the resins that do not soften nor melt by heating during the hardening process are preferred. Examples of these resins include phenol/formalin novolak resin, phenol/formalin resol resin, phenol/furfural resin, xylene/formaldehyde resin, urea resin, melamine resins, dry oil modified alkyd resins, phenol resin modified alkyd resins, maleic acid resin modified alkyd resins, unsaturated polyester resins, and a combination of an epoxy resin and a hardening agent. They can be used alone or in combination.

The total amount of binders (i.e., binders of the present invention and the other binders) which can be used is generally 10 to 100 parts by weight, preferably 15 to 50 parts by weight, and more preferably from 18 to 35 parts by weight, based on 100 parts by weight of ferromagnetic particles.

$Cr_2O_3$ used as an abrasive agent in the present invention is an acicular chromium sesquioxide preferably having an average length in the long axis of 1.0 μm or less, an average length in the short axis of 0.1 μm or less and an acicular ratio of from 5 to 20, and particularly preferably having an average length in the long axis of from 0.1 to 0.95 μm, an average length in the short axis of from 0.02 to 0.09 μm and an acicular ratio of from 8 to 15.

When the average length in the long axis of $Cr_2O_3$ used as an abrasive agent is 1.0 μm or more, or the average length in the short axis is 0.1 μm or more, or the acicular ratio thereof is 5 or less, or 20 or more, the dispersibility of $Cr_2O_3$ is reduced, the electromagnetic properties are not sufficiently improved, and the magnetic orientation of the ferromagnetic particles is deteriorated, whereby the thus-obtained electromagnetic properties are not improved in some cases.

The upper limit values of the average length in the long axis and the average length in the short axis as referred to above mean the average upper limit values of the average length in the long axis and the average length in the short axis, of $Cr_2O_3$ contained in a magnetic layer and the preferred ranges mean similar to the above.

The above-described $Cr_2O_3$ used in the present invention generally has a Mohs' hardness of about 9.

The acicular $Cr_2O_3$ used in the present invention can be prepared, for example, by the following conventional method. That is, the method comprises dispersing a mixture of $CrO_3$ and $Cr_2O_3$ in water to prepare an aqueous dispersion slurry, heating it in an autoclave for hydrothermal reaction at temperatures of from 350° to 370° C. under pressure of from 300 to 500 atmospheres pressure to obtain acicular $CrO_2$, and then heating the thus obtained $CrO_2$ in air at from 700° to 900° C., preferably from 800° to 850° C. to prepare acicular $Cr_2O_3$. Further, $Cr_2(CrO_4)_3$ which can be obtained by partially reducing $CrO_3$ can be used as a starting material.

In the present invention, the above acicular $Cr_2O_3$ can be incorporated into a magnetic layer in an amount of from 1 to 20 wt %, preferably from 2 to 15 wt %, and more preferably from 4 to 12 wt %, based on the total weight of the ferromagnetic particles contained in the magnetic layer.

Abrasive agents other than the above-described acicular $Cr_2O_3$ of the present invention need not be incorporated in the magnetic layer, but other conventional abrasive agents may be added so long as they do not affect the object of the present invention.

Other conventionally used granular additives (e.g., carbon black having an average particle size of from 0.015 to 0.2 μm as an antistatic agent) can be added so long as they do not affect the accomplishment of the present invention.

The magnetic layer of the magnetic recording medium of the present invention can be prepared by mixing the above described acicular $Cr_2O_3$, ferromagnetic particles, such as ferromagnetic alloy particles, the above described binders, and other granular fillers if desired, with a solvent to prepare a magnetic coating composition, coating the composition on a support, subjecting the coated composition to magnetic orientation, and then drying.

The solvent which can be employed in the mixing is a conventional solvent for preparing a magnetic coating composition.

Mixing can be carried out in accordance with a conventional mixing method for a magnetic coating composition. The orders of adding such component can be optionally selected.

Various methods for preparing a magnetic coating composition have been known, and one of these known methods can be selected for preparing the magnetic recording medium of the present invention.

Conventional additives such as a dispersing agent, an antistatic agent or a lubricating agent can also be used in combination in preparing the magnetic coating composition.

The dispersing agents which can be used include well-known dispersing agents such as a fatty acid having 12 to 18 carbon atoms; a metal soap comprising an alkali metal or an alkaline earth metal of the fatty acid; esters of the fatty acid or compounds of the fatty acid wherein a hydrogen of the fatty acid, the fatty acid esters, and the metal soap is partially or wholly substituted by a fluorine atom; an amide of the fatty acid; an aliphatic amine; a higher alcohol; a polyalkylene oxide alkyl phosphoric acid ester; an alkyl phosphoric acid ester; an alkyl boric acid ester; sarcosinates; alkyl ether esters; trialkyl polyolefin oxyquaternary ammonium salt; lecithin; etc. These dispersing agents can generally be used in an amount of from 0.5 to 2.0 parts by weight, and preferably from 0.7 to 1.8 parts by weight, based on 100 parts by weight of the binder.

Antistatic agents which can be used in the present invention include natural surface active agents; nonionic surface active agents; cationic surface active agents; anionic surface active agents such as a carboxylic acid, a sulfonic acid, a phosphoric acid, or a compound having an acidic group such as a sulfate or a phosphate; and amphoteric surface active agents such as amino acids, aminosulphonic acids, or a sulfate or a phosphate of aminoalcohol. Electroconductive fine particles such as a carbon black which can be used as antistatic agents are used in an amount of generally from 0.2 to 20 parts by weight, and preferably from 0.2 to 10 parts by weight, based on 100 parts of binder. Surface active agents which can be used as antistatic agents are used in an amount of generally from 0.1 to 10 parts by weight, and preferably from 0.1 to 5 parts by weight, based on 100 parts by weight of binder.

Lubricating agents which can be used in the present invention include conventionally known lubricating agents or lubricating agents for plastics such as the above described fatty acids, higher alcohols, fatty acid esters comprising a monobasic fatty acid having 12 to 20 carbon atoms and monohydric or polyhydric alcohols having 3 to 20 carbon atoms such as butyl stearate or sorbitan oleate, a mineral oil, an animal and vegetable oil, an olefin low polymerized compound, an $\alpha$-olefin low polymerized compound, graphite fine particles, and the like. The amount of lubricating agents used can be optionally determined in accordance with conventional technology.

The above-described additives such as dispersing agents, antistatic agents, lubricating agents and the like can be used for the above-described original purposes, but may be used for other purposes. For example, dispersing agents may be used as lubricating agents or as antistatic agents. It should be understood, therefore, that the above classifications of the additives due to their functions are not decisive. Accordingly, if additives having multi-functions are used, the additive amounts thereof should preferably be determined in light of the multiple effects.

The thus prepared magnetic coating composition can be coated on a non-magnetic support in accordance with conventional methods, as disclosed, for example, in *Coating Kogaku (Coating Engineering)* pages 253 to 277 (1971), published by Asakura Shoten, and in Japanese Patent Application (OPI) No. 46011/79 and 21805/79 (the term "OPI" as used herein means an "unexamined published application"). The magnetic coating composition can be directly coated on the non-magnetic support, or can be coated thereon through an adhesive layer.

The thickness of the thus coated magnetic layer is not particularly limited, but the magnetic layer is generally coated so that the dry thickness thereof is about 0.5 to 10 $\mu$m, preferably 1.5 to 7.0 $\mu$m.

The magnetic layer thus provided on the non-magnetic support is generally subjected to magnetic orientation to orient the ferromagnetic particles contained in the magnetic layer, and then dried. Further, if desired, the magnetic layer is subjected to a surface smoothing treatment. The thus smoothing-treated magnetic recording medium is slit to a desired shape. These treatments are described in U.S. Pat. No. 3,473,960.

The present invention is hereinafter illustrated in more detail by the following Examples and Comparative Examples. In the Examples and Comparative Examples, all parts are by weight unless otherwise specified.

EXAMPLE 1

A mixture of $CrO_3$ and $Cr_2O_3$ (the mixing ratio by weight: 1/1) was dispersed in water to prepare a slurry, and the obtained slurry was put in an autoclave and heated for hydrothermal reaction (reaction period: 5 hours) at 350° C. under 300 atmospheres of pressure to obtain acicular $CrO_2$. The obtained acicular $CrO_2$ then was heated in air at 800° C. for 2 hours to obtain acicular $Cr_2O_3$.

The thus obtained acicular $Cr_2O_3$ was used after it was classified.

Then, a magnetic coating composition having the following formulation was prepared and was coated on a polyethylene terephthalate non-magnetic support having a thickness of 10 $\mu$m so that the dry thickness of the resulting magnetic layer was 3.0 $\mu$m.

Magnetic Coating Composition

| | |
|---|---|
| Ferromagnetic alloy particles (Fe—Ni alloy, Ni content; about 5 wt %) (specific surface area (S-BET): 45 m²/g) | 100 parts |
| Copolymer of vinyl chloride/vinyl acetate/ maleic anhydride (86/13/1) (vinyl chloride type resin) (prepared by Nippon Zeon Co., Ltd.: 400 × 110 A, degree of polymerization: 400) | 12 parts |
| Polyurethane (molecular weight: about 50,000; Tg: 45° C.) | 8 parts |
| Polyisocyanate ("Collonate L", a trade name, manufactured by Nippon Polyurethane Co., Ltd.) | 8 parts |
| Methyl ethyl ketone | 150 parts |
| Acicular $Cr_2O_3$ (average length in the long axis: 0.3 $\mu$m; average length in the short axis: 0.03 $\mu$m; acicular ratio: 10) | 5 parts |

The magnetic coating composition, after it was coated on the non-magnetic support, was subjected to magnetic orientation using magnets of 3,000 gauss while the magnetic coating composition was undried. The magnetic coating composition thereafter was dried, and the resulting magnetic layer was subjected to calendering treatment and then was slit to a width of 8 mm to prepare a 8 mm video tape.

Regarding magnetic characteristics of these video tapes, the B-H curve (B: magnetic flux density; H: external magnetic field) was measured. By reading values from the curve, the squareness ratio Br/Bm (Br: maximum residual magnetic flux density; Bm: maximum magnetic flux density) was obtained.

The thus prepared video types were placed in an 8 mm video tape recorder "FUJIX-8", (a trade name, manufactured by Fuji Photo Film Co., Ltd.) and a reproduced output at 5 MHz of a carrier wave, and a noise at 4 MHz of a carrier wave were measured. The reproduced output at 5 MHz of a standerd 8 mm video tape prepared in Comparative Example 1 was used as a standard and defined as 0 dB. The value of the reproduced output of other sample tapes (which are relative values to that of Comparative Example 1), as well as C/N (carrier/noise ratio) values (relative that of Comparative Example 1), and the decrease of the reproduced output after the tapes were run for 100 passes were measured.

Tapes were run repeatedly using the video tape recorder "FUJIX-8" and the number of passes of the tape until a bridging of a magnetic head gap occurred was counted.

Regarding surface gloss, the total reflectivity was measured with a standard photometer at an angle of incidence of 45° and an angle of reflection of 45°, using a digital standard color difference photometer AUD-CH-GV3 prepared by Suga Testing Machine Co., Ltd. The measured values are indicated as relative values based on 100 of the relative-specular glossiness of glass surface measured at an incident angle of 45° and a refractive index of 1.567. The relative-specular glossiness is defined by JIS Z 8741.

COMPARATIVE EXAMPLE 1

The same procedure as in Example 1 was repeated to prepare a video tape except that spherical $Cr_2O_3$ (particle size: 0.3 μm) was used.

COMPARATIVE EXAMPLE 2

The same procedure as in Comparative Example 1 was repeated to prepare a video tape, except that a polyurethane having a Tg of −27° C. was used.

EXAMPLE 2

The same procedure as in Example 1 was repeated to prepare a video tape, except that added amount of $Cr_2O_3$ was 15 parts.

EXAMPLE 3

The same procedure as in Example 1 was repeated to prepare a video tape, except that the added amount of $Cr_2O_3$ was 2.5 parts.

COMPARATIVE EXAMPLE 3

The same procedure as in Example 1 was repeated to prepare a video tape, except that the added amount of $Cr_2O_3$ was 0.5 part.

COMPARATIVE EXAMPLE 4

The same procedure as in Example 1 was repeated to prepare a video tape, except that the added amount of $Cr_2O_3$ was 25 parts.

COMPARATIVE EXAMPLE 5

The same procedure as in Example 1 was repeated to prepare a video tape except, that $Cr_2O_3$ having an average length in the long axis of 0.08 μm, and average length in the short axis of 0.02 μm and an acicular ratio of 4 was used.

EXAMPLE 4

The same procedure as in Example 1 was repeated to prepare a video tape, except that $Cr_2O_3$ having an average length in the long axis of 0.9 μm, an average length in the short axis of 0.07 μm and an acicular ratio of 12.9 was used.

COMPARATIVE EXAMPLE 6

The same procedure as in Example 1 was repeated to prepare a video tape, except that $Cr_2O_3$ having an average length in the long axis of 1.2 μm, an average length in the short axis of 0.06 μm and an acicular ratio of 20 was used.

COMPARATIVE EXAMPLE 7

The same procedure as in Example 1 was repeated to prepare a video tape, except that a polyurethane having a Tg of −27° C. was used.

EXAMPLE 5

The same procedure as in Example 1 was repeated to prepare a video tape, except that a polyurethane having a Tg of 0° C was used.

EXAMPLE 6

The same procedure as in Example 1 was repeated to prepare a video tape, except that a polyurethane having a Tg of 70° C. was used.

COMPARATIVE EXAMPLE 8

The same procedure as in Example 1 was repeated to prepare a video tape, except that a polyurethane having a Tg of 98° C. was used.

COMPARATIVE EXAMPLE 9

The same procedure as in Example 1 was repeated to prepare a video tape, except that acicular $\alpha$-$Al_2O_3$ (average length in the long axis: 0.3 μm; acicular ratio (the long axis/the short axis: 15/1) was used instead of acicular $Cr_2O_3$.

The results are shown in Table 1. In Table 1, in the "Samples" column, "E 1" means Example 1, "C 1" means Comparative Example 1, and so on.

TABLE 1

| Sample No. | Br (G) | SQ | Gloss (%) | Reproduced output (dB) | C/N (dB) | Decrease of reproduced output after 100 passes (dB) | Number of passes until bridging of head gap occurred |
|---|---|---|---|---|---|---|---|
| E 1 | 2900 | 0.83 | 125 | +3.7 | +3.4 | −1.0 | 200 or more |
| C 1 | 2620 | 0.79 | 100 | 0 | 0 | −6.0 | 100 |
| C 2 | 2430 | 0.74 | 82 | −2.5 | −3.2 | −7.3 | 110 |
| E 2 | 2860 | 0.82 | 120 | +3.2 | +2.7 | −0.4 | 200 or more |
| E 3 | 3050 | 0.84 | 131 | +4.5 | +4.1 | −1.6 | 200 or more |
| C 3 | 3070 | 0.84 | 135 | +5.0 | +4.6 | −5.3 | 135 |
| C 4 | 2870 | 0.80 | 130 | +3.1 | +2.5 | −6.2 | 120 |
| C 5 | 2710 | 0.80 | 110 | +1.8 | +1.5 | −0.8 | 200 or more |
| E 4 | 2850 | 0.84 | 120 | +3.4 | +3.2 | −0.7 | 200 or more |
| C 6 | 2900 | 0.81 | 108 | +2.1 | +1.4 | −1.5 | 110 |
| C 7 | 2980 | 0.84 | 135 | +3.9 | +3.5 | −6.3 | 120 |
| E 5 | 3010 | 0.84 | 131 | +3.7 | +3.2 | −1.2 | 200 or more |

TABLE 1-continued

| Sample No. | Br (G) | SQ | Gloss (%) | Reproduced output (dB) | C/N (dB) | Decrease of reproduced output after 100 passes (dB) | Number of passes until bridging of head gap occurred |
|---|---|---|---|---|---|---|---|
| E 6 | 2860 | 0.82 | 123 | +3.4 | +3.0 | −0.8 | 200 or more |
| C 8 | 2650 | 0.80 | 105 | +0.5 | +0.3 | −2.3 | 200 or more |
| C 9 | 2890 | 0.82 | 112 | +2.0 | +1.2 | −3.2 | 100 |

EXAMPLE 7

The mixture of $CrO_3$ and $Cr_2O_3$ (the mixing ratio by weight: 1/1) was dispersed in water to prepare slurry, and the obtained slurry was put in an autoclave and heated for hydrothermal reaction (reaction period: 5 hours) at 350° C. under 300 atmospheres of pressure to obtain acicular $CrO_2$. The obtained acicular $CrO_2$ was heated in air at 800° C. for 2 hours to obtain acicular $Cr_2O_3$.

The thus prepared acicular $Cr_2O_3$ was used after it was classified.

Then, a magnetic coating composition having the following formulation was prepared and was coated on a polyethylene terephthalate non-magnetic support having a thickness of 10 μm so that the dry thickness of the resulting magnetic layer was 3.0 μm.

Magnetic Coating Composition

| | |
|---|---|
| Ferromagnetic alloy particles (Fe—Ni alloy, Ni content; about 5 wt %) (specific surface area S-BET: 45 m²/g) | 100 parts |
| Copolymer of vinyl chloride/vinyl acetate/ maleic anhydride (86/13/1) (vinyl chloride type resin) (prepared by Nippon Zeon Co., Ltd.: 400 × 110 A, degree of polymerization: 400) | 12 parts |
| Polyurethane (containing —SO₃Na groups in an amount of 1 equivalent per of polyurethane (molecular weight: about 50,000) | 8 parts |
| Polyisocyanate ("Collonate L", a trade name, manufactured by Nippon Polyurethane Co., Ltd.) | 8 parts |
| Methyl ethyl ketone | 150 parts |
| Acicular $Cr_2O_3$ (average length in the long axis: 0.3 μm; average length in the short axis: 0.03 μm; acicular ratio: 10) | 5 parts |

The magnetic coating composition, after it was coated on the non-magnetic support, was subjected to magnetic orientation using magnets of 3,000 gauss while the magnetic coating composition was undried. The magnetic coating composition thereafter was dried, and the resulting magnetic layer was subjected to calendering treatment and then was slit to a width of 8 mm to prepare an 8 mm video tape.

Regarding magnetic characteristics of video tapes, the B-H curve (B: magnetic flux density; H: external magnetic field) was measured. By reading values from the curve, the squareness ratio Br/Bm (Br: maximum residual magnetic flux density; Bm: maximum magnetic flux density) was obtained.

The thus prepared video type was placed in an 8 mm video tape recorder "FUJIX-8", (a trade name, manufactured by Fuji Photo Film Co., Ltd.) and a reproduced output at 5MHz of a carrier wave and a noise at 4 MHz of a carrier wave were measured. The reproduced output at 5 MHz of a standard 8 mm video tape prepared in Comparative Example 10 was used as a standard and defined as 0 dB. The values of the reproduced output of other sample tapes (which are relative values to that of Comparative Example 10), as well as C/N values and the decrease of the reproduced output after the tapes were run for 100 passes were measured.

Tapes were run repeatedly using the video tape recorder "FUJIX-8", and the number of passes of the tape until a bridging of a magnetic head gap occurred was counted.

Regarding surface gloss, the total reflectivity was measured with a standard photometer at an angle of incidence of 45° and an angle of reflection of 45°, using a digital standard color difference photometer AUD-CH-GV3 prepared by Suga Tasting Machine Co., Ltd. The measured values are indicated as relative values based on 100 of the relative-specular glossiness of glass surface measured at an incident angle of 45° and a refractive index of 1.567. The relative-specular glossiness is defined by JIS Z 8741.

COMPARATIVE EXAMPLE 10

The same procedure as in Example 7 was repeated to prepare a video tape, except that polyurethane (Tg: about 20° C.) having no —SO₃Na group and granular $Cr_2O_3$ (particle size: 0.30 μm) were used.

COMPARATIVE EXAMPLE 11

The same procedure as in Example 7 was repeated to prepare a video tape, except that the vinyl chloride type resin was one having —SO₃Na group containing monomers in an amount of 5 mol % based on the total number of mols of monomers used to form the polymer and granular $Cr_2O_3$ (particle size: 0.3 μm) was used.

EXAMPLE 8

The same procedure as in Example 7 was repeated to prepare a video tape except that the vinyl chloride type resin was one having —SO₃Na group containing monomers in an amount of 5 mol % based on the total number of mols of monomers used to form the polymer.

COMPARATIVE EXAMPLE 12

The same procedure as in Example 7 was repeated to prepare a video tape, except that the vinyl chloride type resin was one having -SO₃Na group containing monomers in an amount of 5 mol % based on the total number of mols of monomers used to form the polymer and $Cr_2O_3$ (average length in the long axis: 0.08 μm, average length in the short axis: 0.02 μm) was used.

EXAMPLE 9

The same procedure as in Example 7 was repeated to prepare a video tape, except that the vinyl chloride type resin was one having —SO₃Na group containing monomers in an amount of 5 mol % based on the total number of mols of monomers used to form the polymer and $Cr_2O_3$ having an average length in the long axis of 0.9 μm and an average length in the short axis of 0.07 μm was used.

COMPARATIVE EXAMPLE 13

The same procedure as in Example 9 was repeated to prepare a video tape, except that $Cr_2O_3$ having an average length in the long axis of 1.2 μm and an average length in the short axis of 0.06 μm was used.

COMPARATIVE EXAMPLE 14

The same procedure as in Example 9 was repeated to prepare a video tape, except that the added amount of $Cr_2O_3$ was 0.5 part.

EXAMPLE 10

The same procedure as in Example 9 was repeated to prepare a video tape, except that the added amount of $Cr_2O_3$ was 2.5 parts.

EXAMPLE 11

The same procedure as in Example 9 was repeated to prepare a video tape, except that the added amount of $Cr_2O_3$ was 15 parts.

COMPARATIVE EXAMPLE 15

The same procedure as in Example 9 was repeated to prepare a video tape, except that the added amount of $Cr_2O_3$ was 25 parts.

COMPARATIVE EXAMPLE 16

The same procedure as in Example 9 was repeated to prepare a video tape, except that both the vinyl chloride resin and the polyurethane did not have any $—SO_3Na$ group, and granular $Cr_2O_3$ (particle size: 0.3 μm) in an amount of 15 parts was used.

COMPARATIVE EXAMPLE 17

The same procedure as in Example 7 was repeated to prepare a video tape, except that instead of acicular $Cr_2O_3$, acicular $\alpha\text{-}Al_2O_3$ (average length in long axis: 0.3 μm; acicular ratio (long axis/short axis: 15/1)) was used in the same amount as that in Example 7.

The results are shown in Table 2. In Table 2, "E 7" means Example 7, "C 10" means Comparative Example 10, and so on.

and running durability can be obtained by using a specific acicular $Cr_2O_3$, and at least one material selected from the group consisting of a polyurethane having a glass transition temperature (Tg) of from 0° to 95° C., a polyurethane having a metal sulfonate group, or a vinyl chloride resin having a metal sulfonate group in accordance with the present invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing magnetic particles dispersed in a binder, wherein said magnetic layer contains acicular $Cr_2O_3$ having an average length in the long axis of 1.0 μm or less, an average length in the short axis of 0.1 μm or less and an acicular ratio (long axis/short axis) of from 5/1 to 20/1 in an amount of from 1 to 20 wt % based on the total weight of the magnetic particles, and wherein the binder contains at least one material selected from the group consisting of a polyurethane having a glass transition temperature (Tg) of from 0° to 95° C. or containing a metal sulfonate group, or a vinyl chloride resin containing a metal sulfonate group.

2. A magnetic recording medium as in claim 1, wherein said magnetic layer contains acicular $Cr_2O_3$ having an average length in the long axis of from 0.1 to 0.95 μm, an average length in the short axis of from 0.02 to 0.09 μm, and an acicular ratio of from 8 to 15 in an amount of from 2 to 15 wt % based on a total weight of the magnetic particles.

3. A magnetic recording medium as in claim 1, wherein said material is present in an amount of from 10 to 90 wt % based on the total weight of binder.

4. A magnetic recording medium as in claim 1, wherein said material is present in an amount of from 15 to 85 wt % based on the total weight of binder.

5. A magnetic recording medium as in claim 1, wherein said material is a polyurethane having a glass transition temperature (Tg) of from 0° to 75° C.

6. A magnetic recording medium as in claim 1, wherein said magnetic particles are ferromagnetic alloy particles having a specific surface area ($S_{BET}$) of 42 $m^2/g$ or more.

TABLE 2

| Sample No. | Br (G) | SQ | Gloss (%) | Reproduced output (dB) | C/N (dB) | Decrease of reproduced output after 100 passes (dB) | Number of passes until bridging of head gap occurred |
|---|---|---|---|---|---|---|---|
| E 7 | 3010 | 0.85 | 137 | +5.0 | +4.5 | −0.5 | 200 or more |
| C 10 | 2620 | 0.79 | 100 | 0 | 0 | −6.0 | 100 |
| C 11 | 2780 | 0.80 | 105 | +0.3 | +0.2 | −4.0 | 200 or more |
| E 8 | 3100 | 0.87 | 145 | +6.2 | +5.7 | −0.7 | 200 or more |
| C 12 | 2910 | 0.80 | 143 | +4.2 | +3.7 | −5.4 | 120 |
| E 9 | 3050 | 0.85 | 138 | +5.1 | +4.7 | −0.3 | 200 or more |
| C 13 | 2890 | 0.81 | 120 | +3.5 | +2.9 | −0.4 | 200 or more |
| C 14 | 3150 | 0.86 | 150 | +5.7 | +5.1 | −7.2 | 35 |
| E 10 | 3170 | 0.86 | 145 | +5.0 | +4.8 | −1.0 | 180 |
| E 11 | 2860 | 0.84 | 115 | +4.3 | +3.7 | 0 | 200 or more |
| C 15 | 2510 | 0.80 | 90 | −0.5 | −0.2 | 0 | 200 or more |
| C 16 | 2430 | 0.75 | 81 | −2.5 | −3.1 | −3.2 | 200 or more |
| C 17 | 2890 | 0.82 | 112 | +2.0 | +1.2 | −3.2 | 100 |

As is apparent from the above results of the present invention, a magnetic recording medium having improved surface property, electromagnetic properties

* * * * *